United States Patent
Barto et al.

(10) Patent No.: US 7,596,803 B1
(45) Date of Patent: Sep. 29, 2009

(54) METHOD AND SYSTEM FOR GENERATING ACCESS POLICIES

(75) Inventors: Larry Barto, Austin, TX (US); Nils Bertelsen, Boynton Beach, FL (US); Yiwei Li, Austin, TX (US); David Richardson, Austin, TX (US); Robert Russin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 837 days.

(21) Appl. No.: 10/924,664

(22) Filed: Aug. 24, 2004

Related U.S. Application Data

(60) Provisional application No. 60/587,094, filed on Jul. 12, 2004.

(51) Int. Cl.
*G06F 17/00* (2006.01)

(52) U.S. Cl. .............................. 726/1; 700/90; 700/108; 715/700; 715/733

(58) Field of Classification Search ...................... 726/1, 726/2, 27; 700/96, 117, 121, 90, 108; 715/700, 715/733
See application file for complete search history.

(56) References Cited

U.S. PATENT DOCUMENTS

| | | | |
|---|---|---|---|
| 6,170,019 B1 | 1/2001 | Dresel et al. | |
| 6,510,350 B1 | 1/2003 | Steen, III et al. | |
| 6,535,917 B1 | 3/2003 | Zamanzadeh et al. | |
| 6,594,589 B1 | 7/2003 | Coss, Jr. et al. | |
| 6,748,287 B1 | 6/2004 | Hagen et al. | |
| 6,785,692 B2 | 8/2004 | Wolters, Jr. et al. | |
| 7,024,636 B2 * | 4/2006 | Weed ............................. | 716/1 |
| 7,246,370 B2 * | 7/2007 | Valente et al. .................. | 726/1 |
| 2001/0020195 A1 | 9/2001 | Patel et al. | |
| 2001/0054044 A1 | 12/2001 | Liu et al. | |
| 2002/0002577 A1 | 1/2002 | Garg et al. | |
| 2002/0022969 A1 | 2/2002 | Berg et al. | |
| 2002/0026514 A1 * | 2/2002 | Ellis et al. .................... | 709/227 |
| 2002/0029086 A1 | 3/2002 | Ogushi et al. | |
| 2002/0077981 A1 | 6/2002 | Takatori et al. | |
| 2002/0116643 A1 | 8/2002 | Raanan et al. | |
| 2002/0193966 A1 | 12/2002 | Buote et al. | |
| 2003/0084350 A1 | 5/2003 | Eibach et al. | |
| 2003/0171885 A1 | 9/2003 | Coss, Jr. et al. | |
| 2003/0182422 A1 * | 9/2003 | Bradshaw et al. ........... | 709/225 |
| 2003/0208448 A1 | 11/2003 | Perry et al. | |
| 2003/0220768 A1 | 11/2003 | Perry et al. | |
| 2004/0024764 A1 | 2/2004 | Hsu et al. | |
| 2005/0071659 A1 * | 3/2005 | Ferguson et al. ............ | 713/193 |

FOREIGN PATENT DOCUMENTS

| | | |
|---|---|---|
| WO | 0133759 A1 | 5/2001 |
| WO | 0138995 A1 | 5/2001 |

OTHER PUBLICATIONS

Actions on the Merits by the U.S.P.T.O. as of Jul. 7, 2008, 2 pages.

\* cited by examiner

*Primary Examiner*—Ellen Tran

(57) ABSTRACT

A method and system for generating security rules for implementation by a rule interpretation engine to define accessibility to one or more aspects of an Enterprise System is described. The method and system allow a security officer to graphically indicate an operation to be affected by the security rule being defined; a specific aspect of the system affected by the rule; a security regulation to be implemented by the rule; and an access type to be permitted by the rule.

47 Claims, 14 Drawing Sheets

US 7,596,803 B1

METHOD AND SYSTEM FOR GENERATING ACCESS POLICIES

CROSS-REFERENCE TO RELATED APPLICATION(S)

This application is related to U.S. patent application Ser. No. 10/694,151, filed Oct. 27, 2003, entitled "Symmetric Data Security," naming inventors Nils Bertelsen et al., which is hereby incorporated by reference.

PRIORITY APPLICATION

This patent application claims benefit under 35 U.S.C. 119(e) of the U.S. Provisional application No. 60/587,094 filed on Jul. 12, 2004, entitled: "METHOD AND SYSTEM FOR GENERATING POLICIES"

The United States Government has a paid-up license in this invention and the right in limited circumstances to require the patent owner to license others on reasonable terms as provided for by the terms of Cooperative Agreement No. 70NANB1H3047 awarded by the United States Department of Commerce, National Institute of Standards and Technology ("NIST"), Advanced Technology Program ("ATP").

BACKGROUND

1. Field of the Disclosure

The present disclosure relates generally to generating security policies, and more particularly to generating security policies using a graphical user interface.

2. Description of the Related Art

Configuring security policies for large data models of Enterprise Systems can be a daunting task. For example, modern Enterprise Systems, such as a semiconductor fabrication facility, which themselves may be part of a larger Enterprise System, can use large numbers of fabrication and control tools. Each one of these tools can have hundreds or thousands of data items, events, and alarms that are represented by a data model of the tool.

The ability to provide users accessibility to some or all of the information associated with an Enterprise System via its data models allows for advantageous collaborative efforts, such as the ability for remote users to assist with eDiagnostics of various portions of the Enterprise System. Security rules are written by security personnel and stored in various formats such as Clips, XML, or proprietary formats. These security rules are implemented by a rule interpretation engine, such as JESS™, which is commercially available from Sandia National Laboratories.

The writing of complex security rules for data models associated with complex Enterprise Systems can be error-prone, leading to undesirable access to equipment and information by unauthorized users. A system and or method of defining security rules that overcomes these issues would be advantageous.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

A method and system for generating security rules for implementation by a rule interpretation engine to define accessibility to one or more aspects of an Enterprise System is described. The method and system allow a security officer to graphically indicate an operation to be affected by the security rule being defined; a specific aspect of the system affected by the rule; a security regulation to be implemented by the rule; and an access type to be permitted by the rule. Specific embodiments of the present disclosure are better understood with reference to FIGS. 1-18.

Figure 1:
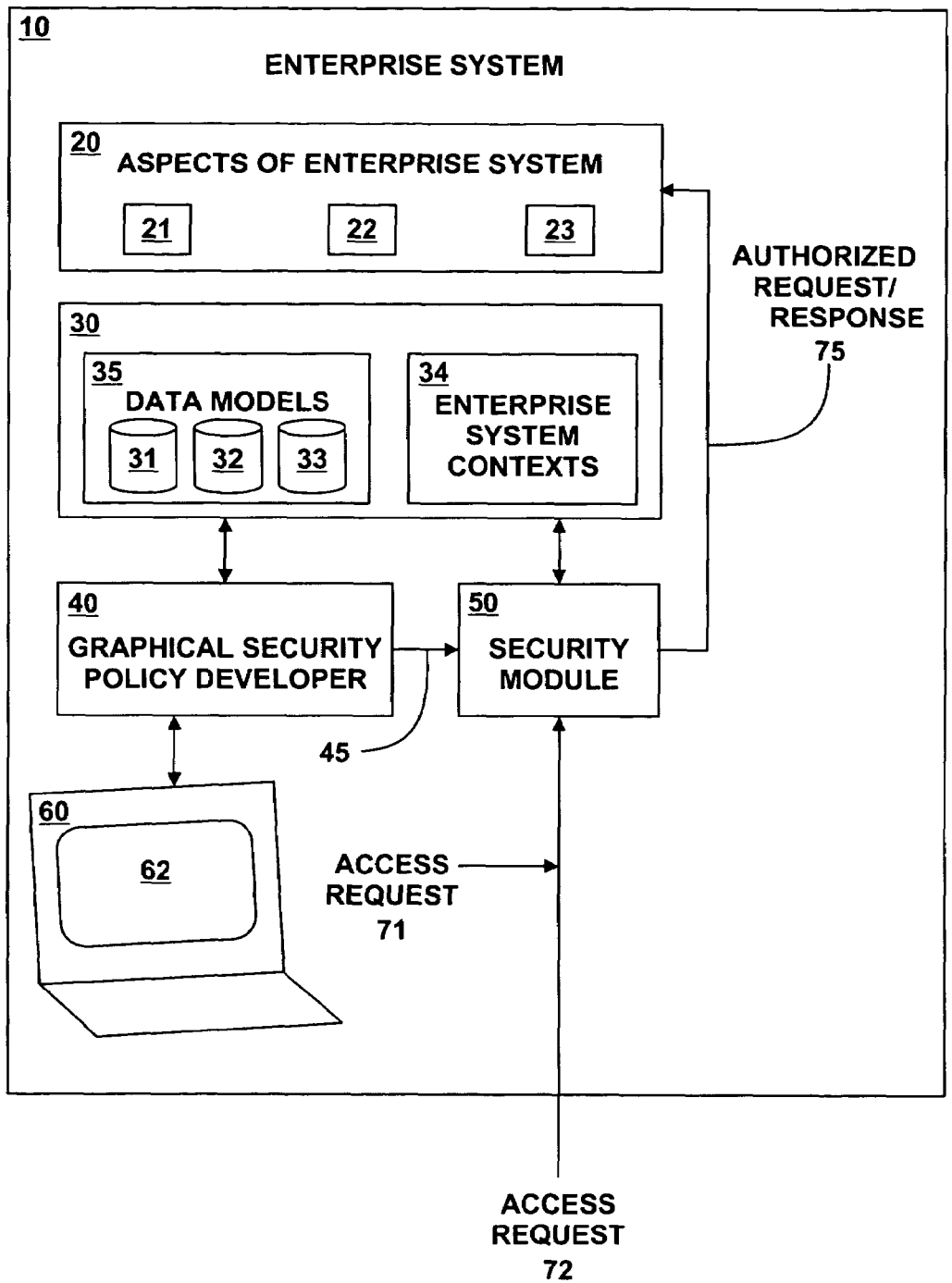
FIG. 1 illustrates in block diagram form a system in accordance with a specific embodiment of the present disclosure.

FIG. 1 illustrates, in block diagram form, an Enterprise System 10. The Enterprise system 10 includes aspects 20, data 30, Graphical Security Policy Generator 40, Security Module 50, and Graphical User Interface Device 60.

In operation, the Graphical Security Policy Developer 40 facilitates definition and generation of security access rules 45 that are to be provided to security module 50 as part of an overall security policy. The Graphical Security Policy Developer 40 supports the generation of security access rules by providing a graphical interface at a device 60 having a display area 62 to facilitate the identification of operations, aspects, and contexts of the Enterprise System 10 for which a security access rule is to be based.

The operations, aspects, and contexts as provided by the Policy Developer 40 are derived from a plurality of data models of the Aspects of Enterprise System 20. Some of the data models used by the Policy Developer 40 can be available directly from the System 20, i.e. an aspect of the physical System 20 can be accessed by the policy developer 40 directly or through the security module 50 to obtain data model information. In other embodiments, the data models for various aspects of the system 20 are not directly available from the system 20 and need to be provided as part of data 30. The accessed data model information whether received from system 20 directly or otherwise provided may be stored as part of the plurality of data models 35.

The various aspects and contexts of the Enterprise System 10 are graphically displayed by the Graphical Security Policy Developer 40 to allow development of a rule. Once a rule is developed, it is provided to the security module 50, which will authorize requests 75 to the Aspects of the Enterprise System 20 based upon the rule, and current data and states of the Aspects of the enterprise system 20. In the embodiment illustrated herein, a representation of the current data and states of enterprise system 20, i.e. Enterprise System Contexts 34, are accessed by the Security Module 50 from data area 30. For purposes of discussion, a specific embodiment where Enterprise System 10 is a semiconductor fabrication facility will be discussed. However, it will be appreciated that the Enterprise System 10 can be any of a wide variety of enterprises.

Figure 2:
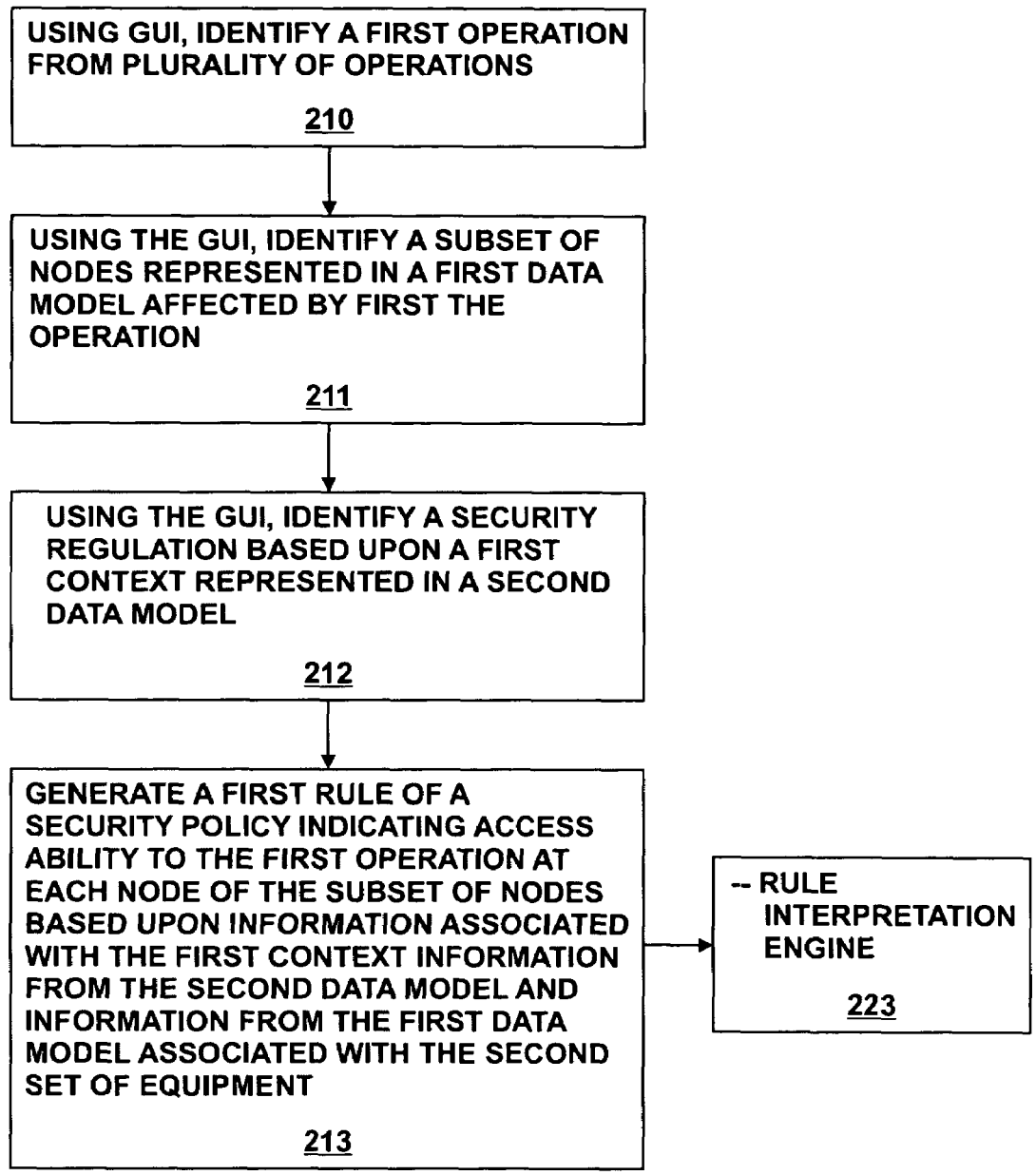
FIG. 2, illustrates in flow diagram form a method in accordance with a specific embodiment of the present disclosure.
Figure 3:
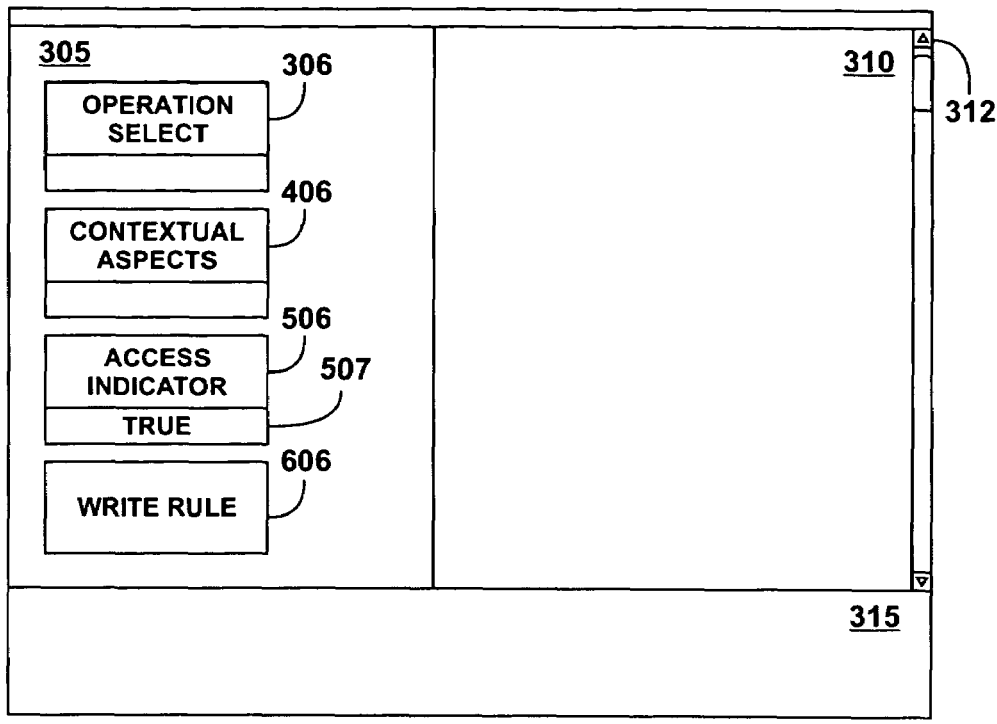
FIGS. 3-13, 16 and 17 illustrate in block form graphical user interfaces in accordance with a specific embodiment of the present disclosure.

FIG. 2 illustrates, in flow diagram form, a method in accordance with the present disclosure. At step 210, a first operation is identified from a plurality of operations using a graphical user interface (GUI). The first operation is one of a plurality of operations used to access specific information, provide specific information, or access control operations relating to one or more specific aspects of the Enterprise System 10. The individual aspects that can be affected by selecting the first operation form a set of aspects, that itself is a subset of all aspects of the Enterprise System. FIG. 3 illustrates a GUI having display areas 305, 310, 315, and a scroll bar 312. Display area 305 is illustrated to include user selectable features 306, 406, 506, and 606. Feature 306 is a button labeled OPERATION SELECT, which when selected facilitates graphical identification of the first operation. The user of the GUI defining security access rules is referred to herein, for clarity, as a security officer. Note that a default value of TRUE is displayed at location 507 and is associated with the button labeled ACCESS INDICATOR.

Figure 4:
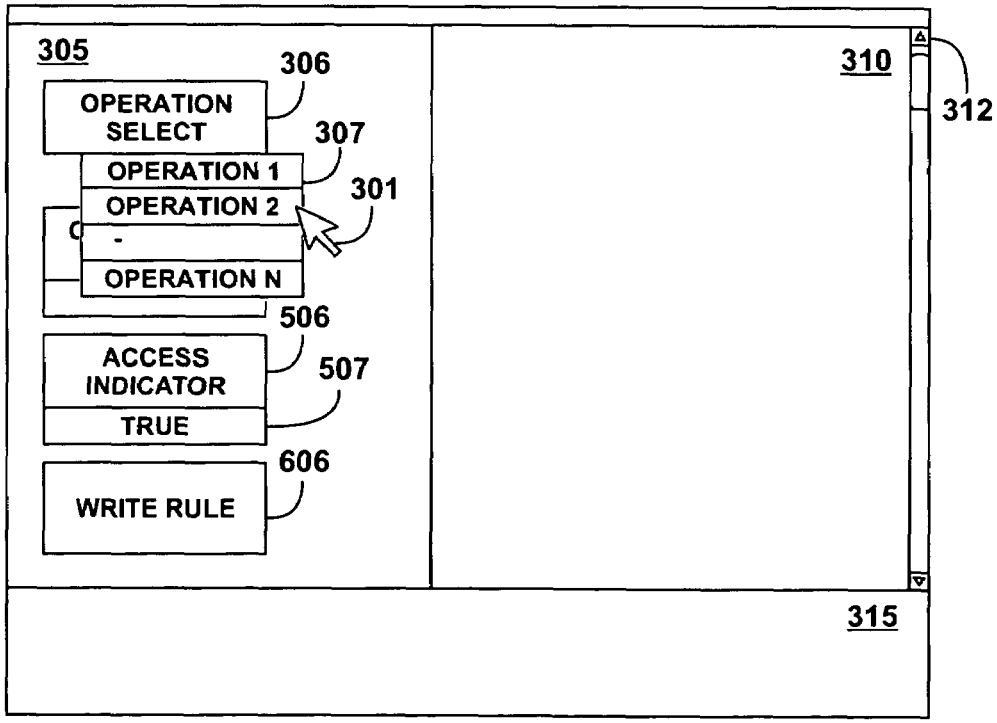

FIG. 4 illustrates the GUI subsequent to the security officer's selection of the OPERATION SELECT button 306. The selection of button 306 results in display of the drop-down list 307, which lists operations for selection by the security officer. It will be appreciated that drop-down lists are but one embodiment of providing a graphical interface to the security officer for the purpose of selecting items. Any other graphical method suitable for selecting items can be used, including check boxes, radio buttons, menus, and trees.

In the illustrated embodiment, a cursor 301 is positioned to select the operation labeled OPERATION 2. Examples of various operations that can be selected are illustrated in TABLE 1, and include a sensor read operation, a FTP (File Transfer Protocol) access operation, an equipment register access operation, a define system routine operation, a delete of system routine operation, an activate system routine operation, a de-activate system routine operation, an operation to allow remote operation/control of equipment, and an equipment login operation.

TABLE 1

OPERATIONS

SENSOR READ
FTP ACCESS
EQUIPMENT REGISTER ACCESS
ROUTINE DEFINITION
ROUTINE DELETION
ROUTINE ACTIVATE
ROUTINE DE-ACTIVATE
REMOTE OPERATION
EQUIPMENT LOGON

Additional operations are also anticipated. It will be appreciated that the listed operations can be broadly classified as a data access (read), or as data write operations, where data write operations can include control operations. Therefore, fewer operations may also be used. An example of a specific routine would be a data collection plan routine specified by a requestor to indicate a data collection plan that identifies data to be collected by a tool during processing. A data collection plan activate operation is an operation that can be used to actually activate a specific data collection plan.

Figure 5:
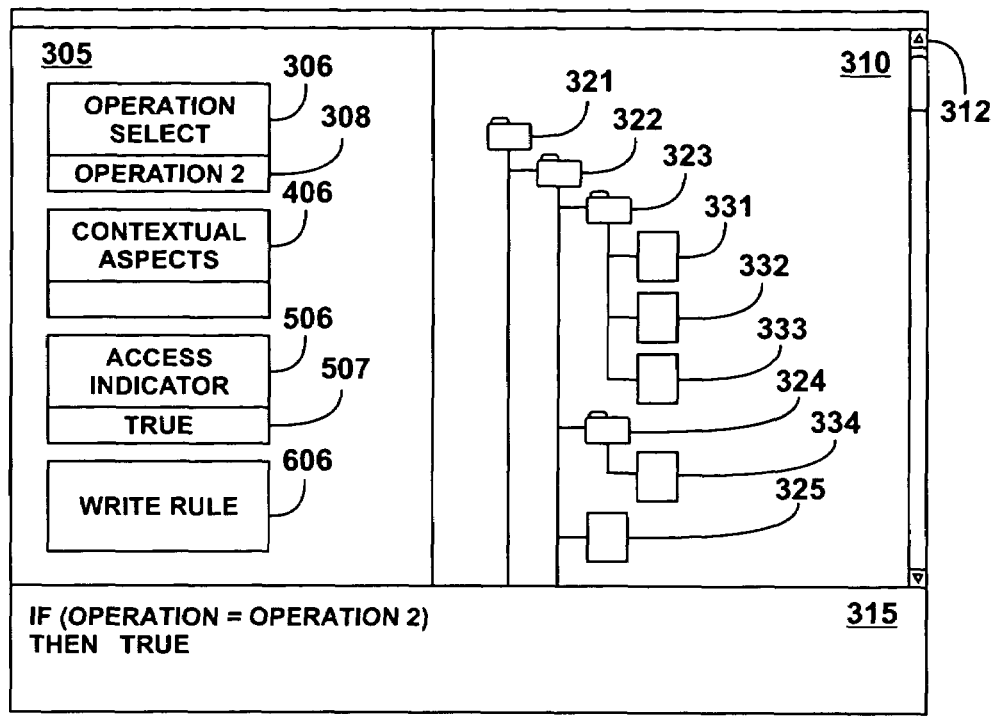

FIG. 5 illustrates the GUI of FIG. 4 after selection of OPERATION 2. For purposes of discussion, OPERATION 2 is considered a sensor read operation used to read sensors associated with tools/equipment of the Enterprise System 10. With respect to the security rule being generated, OPERATION 2 is a specific context of the Enterprise System 10 to be evaluated. This context, OPERATION 2, will be identified by a security regulation in the rule being defined. A textual representation of the rule as currently defined by the security officer is illustrated in viewable area 315. Specifically, as a result of the selection of OPERATION 2 by the security officer, an IF statement is illustrated having a security regulation (clause) that will be true when an operation being evaluated is an OPERATION 2 operation. For example, the rule as currently defined would be found TRUE for any Sensor Read (OPERATION 2) operation. By selecting the WRITE RULE button 606 at this point in time would result in generation of a rule that would allow all sensors to be accessible by a Sensor Read operation (OPERATION 2). Such a rule, if generated, would allow access to sensors independent of any other system contexts. For example, all users would be capable of reading any sensor.

Note, that value TRUE is a logical access indicator shown at location 507 and is associated with button 506 of FIG. 3. The value at location 507 can be a default value or a selected value modified by selecting the button 506. In a specific embodiment, the logical access indicator may have values of TRUE, FALSE, or CONDITIONAL. The logical access indicator FALSE indicates the rule being defined will deny access to an aspect being accessed when all clauses (security regulations) are true. The logical access indicator CONDITIONAL indicates that a rule being defined will filter data being requested so that it may be modified from its original form, as discussed in greater detail herein, in response to the security regulation conditions being true.

FIG. 5 illustrates at viewable area 310 a tree-type hierarchical representation of the Enterprise System 10 that includes various branches and leaves. For purposes of discussion, the branch 321 represents a specific equipment type associated with a semiconductor fabrication facility, which in an alternate embodiment could be illustrated as the member of a parent branch. The branch 322 represents a specific piece of equipment of the equipment type associated with branch 321. Branch 323 represents a subsystem, which includes a specific data type, associated with the specific piece of equipment represented by branch 322. The nodes 331-333 are specific data nodes, or leaves, that represent data associated with sensors of equipment 323. It will be appreciated that only a limited number of branches have been illustrated, and that additional branches may exist above branch 321, as a branch belonging to any bottom level branch, or intervening between any existing branches, or branch and node.

In one embodiment, the Graphical Security Policy Developer 40 will illustrate only the set of Enterprise System branches and leaves (nodes) that relate to aspects that can be affected by the selected operation. For example, the nodes 331-335 of FIG. 5 can each represent only those aspects of the Enterprise System 10 accessible as part of a sensor read operation (OPERATION 2). In an alternate embodiment, the Graphical Security Policy Developer 40 will display branches and leaves of the Enterprise System that are not capable of being accessed by the sensor read operation (OPERATION 2). For example, branch 324 may represent an equipment register that stores an equipment identifier, and is therefore not accessible by a sensor access operation, even though it is illustrated.

Figure 6:
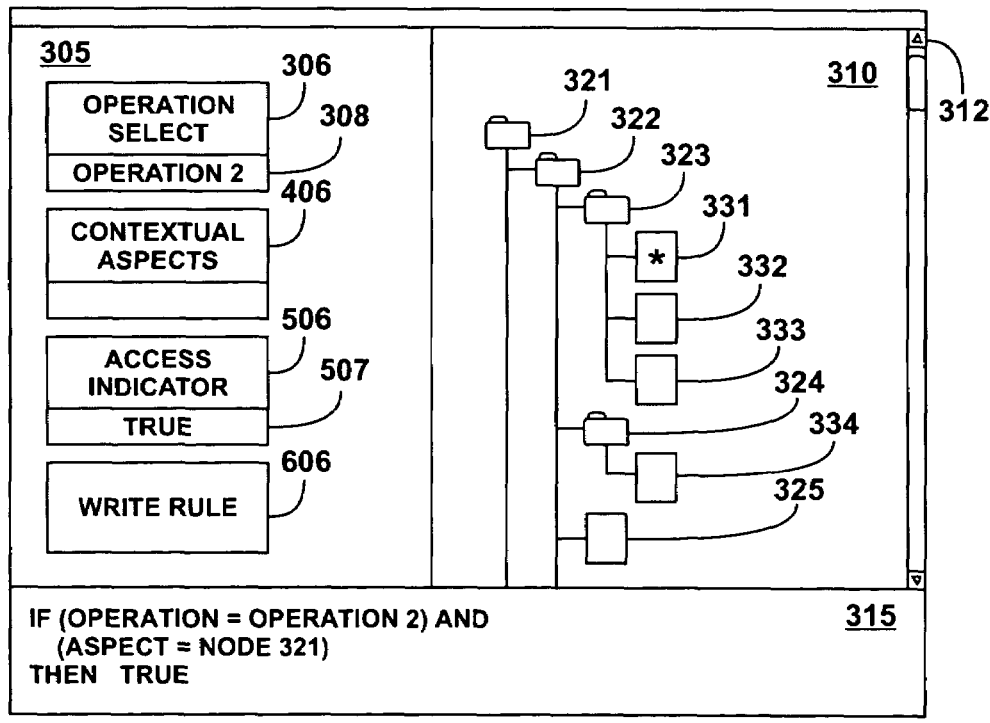

At step 211 (FIG. 2), the security officer selects a subset of nodes capable of being affected by the first operation. The selected subset of nodes, which can include all nodes capable of being affected by the first operation, is selected using the GUI. In one embodiment of the present disclosure, all nodes that can be affected by the first operation are represented in a common data model, such as data model 31 (FIG. 1). In an alternate embodiment, the nodes that can be affected by the first operation are represented in separate data models, such as data model 31 and data model 32. Referring to FIG. 6, the nodes 331-333 each represent sensor nodes represented by a common data model of a semiconductor tool, such as a metrology tool, handling tool, processing tool, or any other tool type. However, there may be other nodes accessible through the viewable areas that are represented in a different data model. For example, one data model allows the policy developer 40 to display the nodes 331-332 of FIG. 6, while a different data model allows the policy developer 40 to display the nodes illustrated in FIG. 9 below 40 to select user and role information.

In FIG. 6, node 331 includes an asterisk (*) it to indicate it has been selected by the security officer as a member of the subset of nodes pursuant to step 211. The asterisk may represent any discernable graphical indicator, such as color or level of boldness, that indicates its selection. Typically, the security officer selects a node by positioning an arrow over it and clicking, or by similarly selecting a branch to which the node belongs, thereby selecting all nodes in the branch. The accessibility of this node is to be at least partially defined by the rule being defined by the current session. In an embodiment, the security officer through the GUI can select nodes whose accessibility cannot be affected by the selected operation. However, selected nodes not capable of being affected by the current operation will be subsequently ignored during the generation of the security rule, or their selection will otherwise not affect security regulations that incorporate them. Alternatively, nodes not capable of being affected by an operation may be illustrated but not selectable.

As a result of the node 331 being selected, the textual representation of the rule as currently defined, in area 315, is illustrated to include a security regulation further limiting the IF statement to the context of the operation (OPERATION=OPERATION 2), as described previously, and to the context of the selected aspect (ASPECT=NODE 331). Therefore, the rule as currently defined will only apply to sensor requests to node 331.

In accordance with an embodiment of the present disclosure, the individual branches and nodes displayed through area 310 can have specific visual properties to indicate whether they are affected by the rule currently being defined. For example, when the logical access indicator of the current rule is TRUE, nodes affected by the rule can have a color based visual property, such as green, to indicate the rule as currently defined will allow access to the node when all clauses of the rule are true. For example, each node and branch of FIG. 5 would be displayed as green to indicate that all aspects (nodes) relating to the selected operation will be accessible by the current rule being defined during a sensor read (OPERATION 2) operation. However, after the selection of node 331 in FIG. 6, only node 331 would be displayed as green, indicating it can be affected by the current rule being defined, and that it will be accessible (TRUE) when security regulations, i.e., IF statement clauses, or contexts, are true. When a rule has a logical access indicator of FALSE, access will be denied when all contexts are true. Nodes that will be denied access will have a different visual property than those when access is to be permitted. For example, a color based visual property on a node, such as red on a node, can indicate that accessibility to that node is to be denied. A different color based visual property, such as yellow, can indicate that the current rule can affect the node, and that the CONDITIONAL logic access indicator is being applied when all contexts are true. Nodes that are not capable of being affected by a current rule can be displayed as black. In one embodiment, the color of a branch reflects access to that node and through propagation, any node or leaf under it that doesn't have a more specific access defined to override it. In an alternative embodiment, a branch containing a single node capable of being affected can acquire that node's color, or it can have a unique color based upon whether there are multiple nodes that may or may not be affected.

Figure 9:
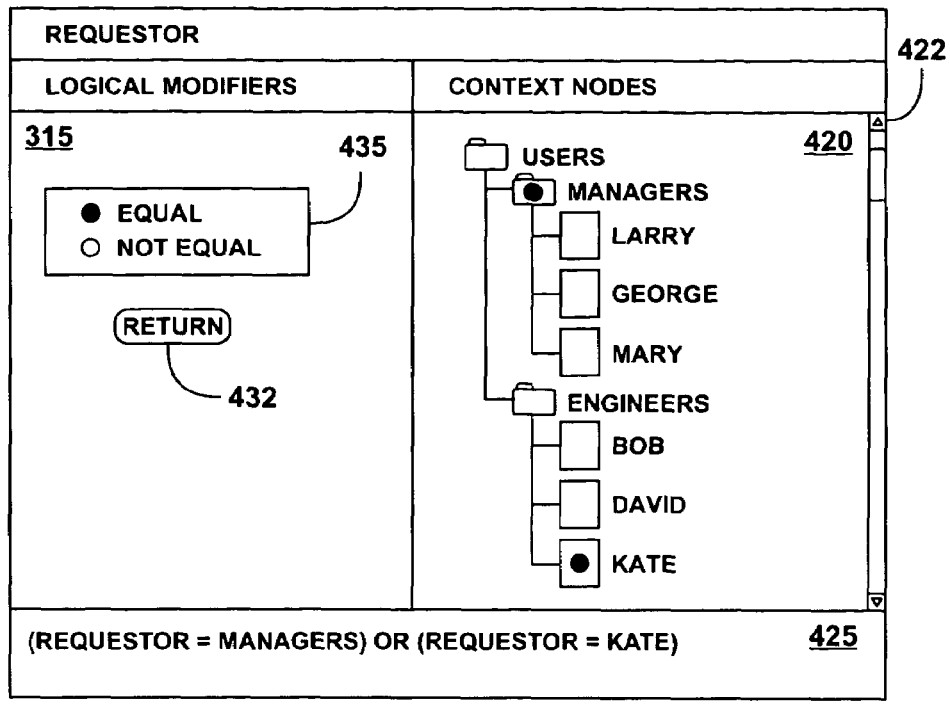
Figure 10:
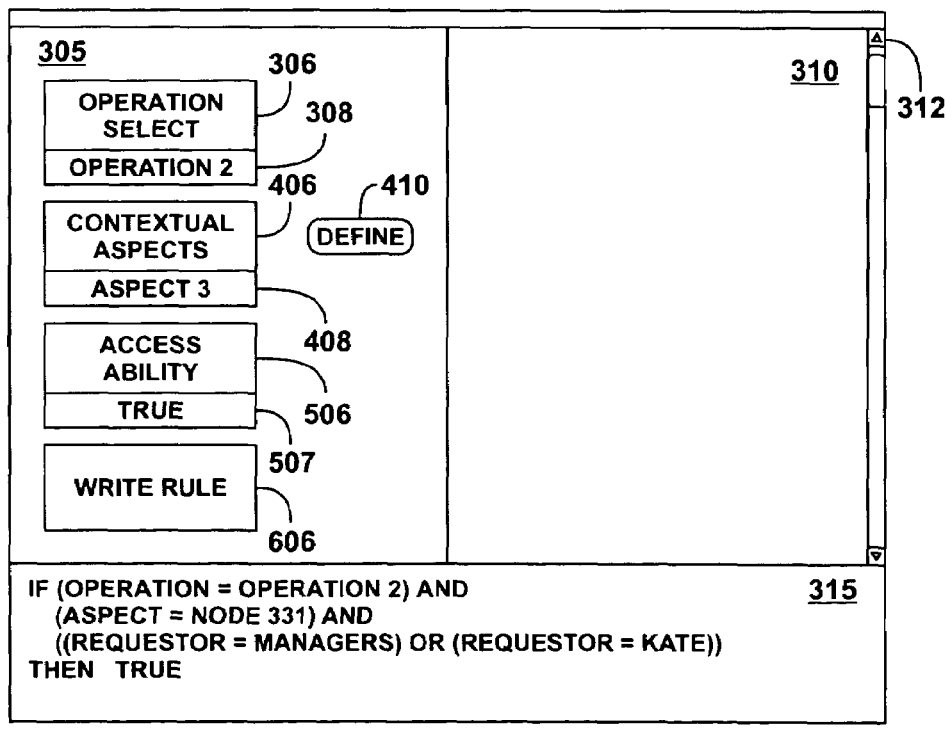
Figure 11:
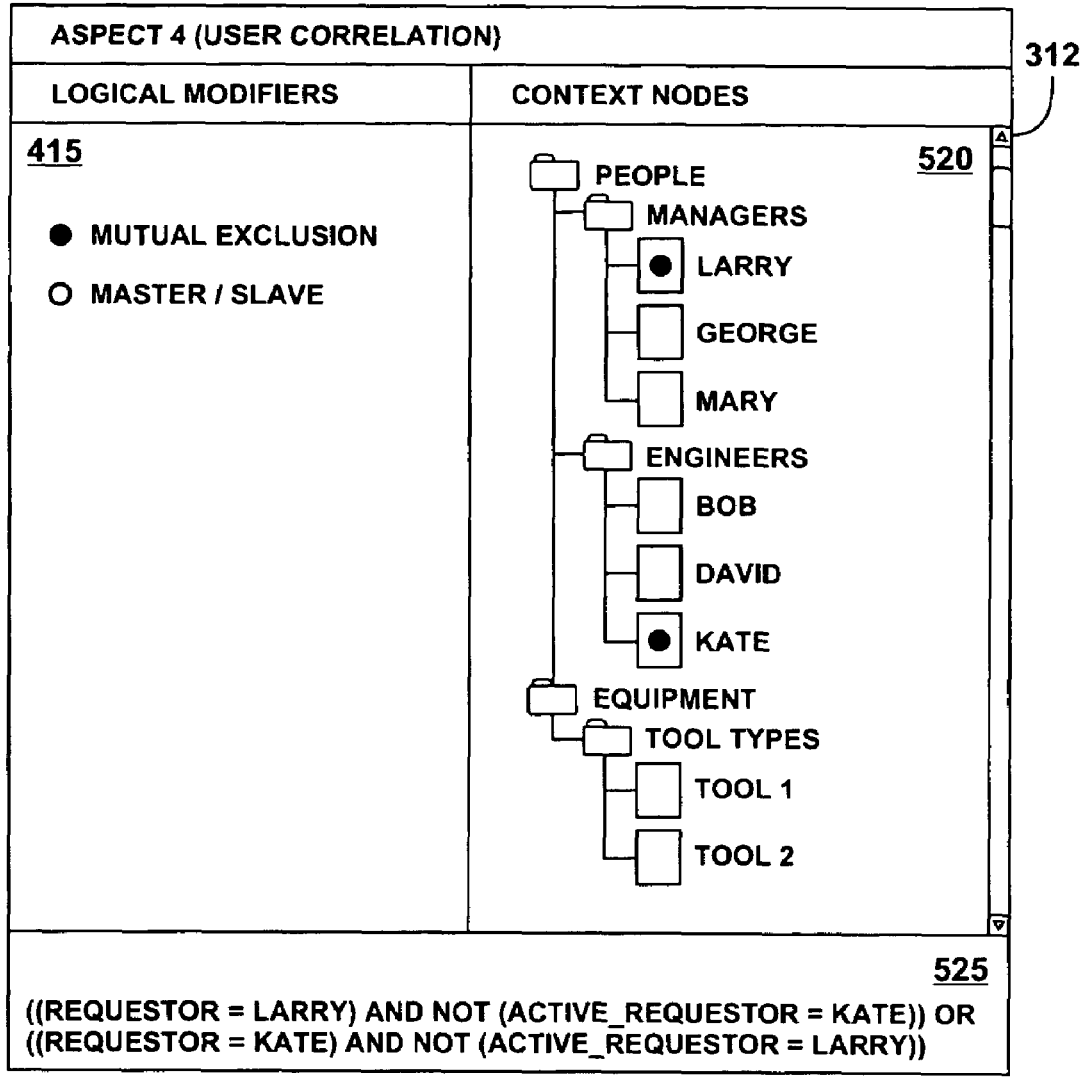

At step 212 (FIG. 2), a security regulation is selected that is based upon a first context represented in a data model separate from the data model containing context information of a node selected at step 211. A security regulation limits the applicability of a rule based on system or requester context. Each clause of a rule is a security regulation that limits the applicability of a rule. FIGS. 9-11 illustrate security regulations being added that are based upon the context of a requestor. Such security regulations specifically include or exclude a rule from applying to a request based on the requester.

Figure 7:
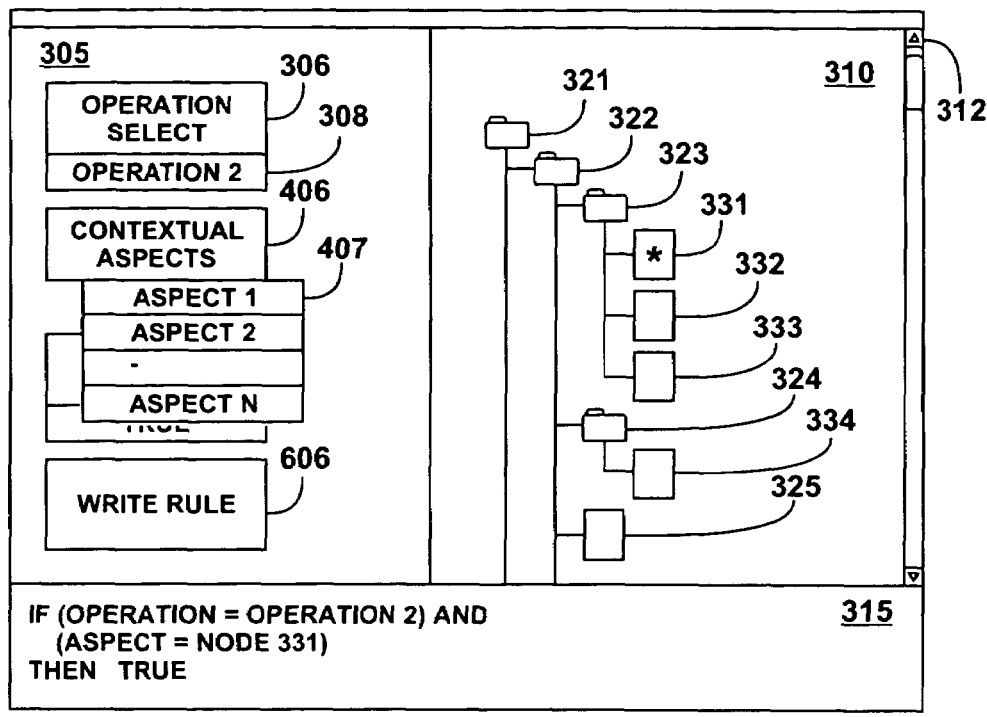

FIG. 7 illustrates selection of the CONTEXTUAL ASPECT button 406. Selections of the CONTEXTUAL ASPECT button 406 by the security officer results in the drop down list 407 being displayed. The security officer can now select a specific aspect of the Enterprise System listed in the drop down list 342 that is to provide a context for the security regulation being selected. In one embodiment, the aspect selected is that of REQUESTOR, wherein the REQUESTOR aspect identifies a source that may attempt to access the aspect, or information associated with the aspect, of the Enterprise System identified at step 211. Selection of REQUESTOR as the particular aspect allows the security officer to generate security rules further based on requester contexts. In a specific embodiment of the present disclosure, information associated with the aspect selected at step 212, such as requestor information, is stored or represented in a data model that is separate from the data model that contains the system aspect selected at step 211 that is to be affected by the rule being defined. Allowing for information associated with separate data models to be accessed or displayed through a GUI facilitates the creation of complicated security rules in a simplified, less error-prone manner.

Figure 8:
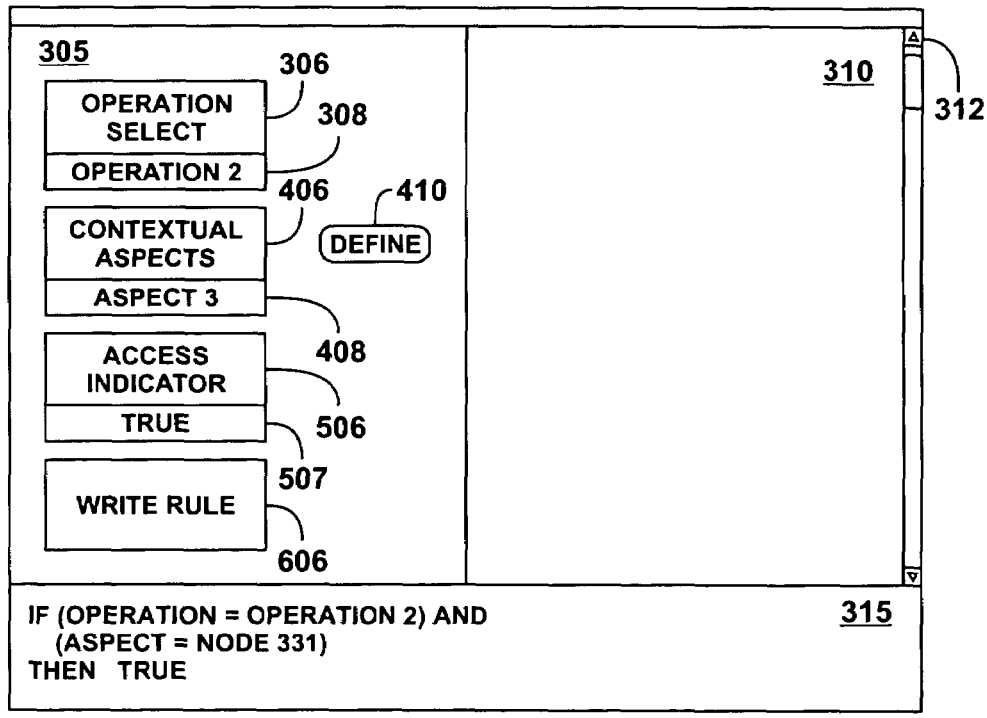

FIG. 8 illustrates a representation of a GUI interface, after the security officer has selected ASPECT 3. ASPECT 3 corresponds to a specific aspect of the Enterprise System whose context will affect whether the rule being defined for the subset of nodes selected at step 211 will affect access to the subset of nodes. For purposes of discussion, ASPECT 3 is presumed to be REQUESTOR, which is an aspect type that allows for requestor-based contexts to be identified by the security officer. The DEFINE button 410 is selected by the security officer to go to an alternate GUI display, FIG. 9, to identify aspect specific contexts of the selected aspect type for inclusion in the rule being defined.

The GUI FIG. 9 is provided by the Graphical Security Policy Developer 40 in response to the selection of ASPECT 3, aspect corresponding to requesters. In the embodiment of FIG. 9, a hierarchical representation of users is illustrated in viewable area 420. While the users listed are human users associated with specific roles, the hierarchical list can also include users that are non-human requesters, such as equipment or applications capable of making access requests. As indicated in FIG. 1, an access request can originate from within the Enterprise System, Access Request 71, or from external the Enterprise System, Access Request, 72. Access requests 71 and 72 can be received from either human or non-human generated requests.

The embodiment illustrated in FIG. 9 illustrates the group (branch) identified as managers as selected. In an alternate embodiment, selection of a group results in each member marked as selected as well. By marking each member of a group as selected, de-selection of a member of the group by the security officer is readily facilitated. For example, a each member of a group can be selected by selecting the common group indicator. Further indicating at least one member of the third set for exclusion from the second set can also be accomplished through the graphical interface.

Kate, who belongs to the Engineer group, has been individually selected at the node (leaf) level. To assist the security officer, the display area 425 illustrates a textual representation of the security regulation definition related to the current aspect (requester).

The logical format that the current textual representation is presented in FIG. 7 is but one possible embodiment that lists contexts in terms of roles and individuals. In an alternate embodiment, all contexts can be listed in the logical format by individuals only. Another embodiment of the disclosure would allow a security officer to select or define the manner in which the textual representation of the requestor clauses is displayed. When the security Officer is done selecting requestor contexts relative to the current aspect (ASPECT 3), the RETURN button 432 is selected to return to the previous screen, now represented in updated form as FIG. 10.

FIG. 10 represents the GUI of FIG. 8 subsequent to the identification of requestors to be affected by the current rule being defined. The representation of the security rule in viewable area 315 has been updated to include a security regulation based upon a context of Managers and a security regulation based upon a context of Kate. The security officer may continue to add security regulations by selecting additional contextual aspects, i.e. other than ASPECT 3 aspects, using the GUI in a manner similar to that described.

At step 213, a first rule of a security policy is generated that indicates the accessibility of information associated with each node of the subset of nodes selected at step 211. The generated rule is based upon contextual information selected at step 212, and associated with the second data model and contextual information relating to the subset of nodes selected at step 211 which is associated with the first data model, as well as based upon the operation selected at step 210. For example, with respect to the embodiment describe above, the generated rule will be based upon the OPERATION 2, i.e. sensor read operation, information from the first data model (information identifying node 331), and information from a second data model (user based information).

In one embodiment, the WRITE RULE button 606 is selected by the security officer to generate the rule in a format to be interpreted by a rules engine. Examples of specific rules formats include CLIPS or XML. Security rules translated to the selected format are then written to text files or data base tables until ready for release. The generated rule is subsequently provided to a rules interpretation engine (not specifically illustrated) of a security module 50 to be interpreted as part of an overall security policy. Examples of rules interpretation engines include JESS, Mandarax, Drools, Eclipse, Common Rules, and iLog.

FIGS. 1-10 illustrate a specific embodiment of the present disclosure, it will be appreciated that many additional features and specific embodiments exist. Examples of additional features in accordance with the present disclosure are disclosed in FIGS. 11-13 below.

As previously discussed, a logical access indicator of TRUE indicates that when all contexts of a rule are met an access request is allowed. A logical access indicator of FALSE indicates that when all contexts of a rule are met an access request is denied. A logical access indicator of CONDITIONAL indicates that when all contexts of a rule are met conditional access is allowed. A conditional access is an access that filters, or otherwise modifies the requested information and provides this modified information to the requester. In a specific implementation, the CONDITIONAL indicator includes an indication of a filter to be applied to the data being accessed. For example, a security access indicator of "CONDITIONAL(FILTER1)" would apply a filtering function stored within the file named FILTER1 to the data being accessed. The filter information stored in the file FILTER1 defines how to filter the data being accessed can be a proprietary or standard protocol. Many types of data filtering protocols can be used, such as .XSL files for XML translation. An example of when a CONDITIONAL security access indicator would be used is when it is desirable for a requestor to not have visibility to sensor data when the sensor data is outside of a specific range. The filter function stored in the file FILTER1 would modify the data only when outside the range to change the observed value or to provide no data in response to this condition existing. Another embodiment converts specific values to a range, i.e. <50=Low, 50-100=Medium; and >100=High.

FIG. 11 illustrates a GUI displayed by the Graphical Security Policy Developer 40 in response to the security officer selecting an aspect referred to herein as a User Correlation aspect. The User Correlation aspect is used to identify specific combinations, i.e. correlations, of users or requesters that are not permitted. The GUI of FIG. 11 illustrates a single option in viewable area 415 labeled MUTUAL EXCLUSION. In a specific embodiment, this option is always selected and serves as a reminder to the security officer that the individuals being selected can access the system in a mutually exclusive manner only. In the viewable area 520, Larry and Kate are illustrated as having been selected. A logical representation of the User Correlation context is displayed as a textual representation in the viewable area 525, and illustrates that security regulations are generated that prohibit either Larry or Kate from being a requestor if the other is already an active requester, i.e. authorized to access information or accessing information. This feature can be used to prevent individuals from working together to determine system information that they would otherwise not be able to determine. Yet, another option allows MASTER/SLAVE operations, where the slave can only have access when the master is not an active requestor. In one embodiment, masters can be represented by a "right mouse click, and be identified by a unique visual indicator relative to a slave, which can be selected with a left mouse click.

Figure 12:
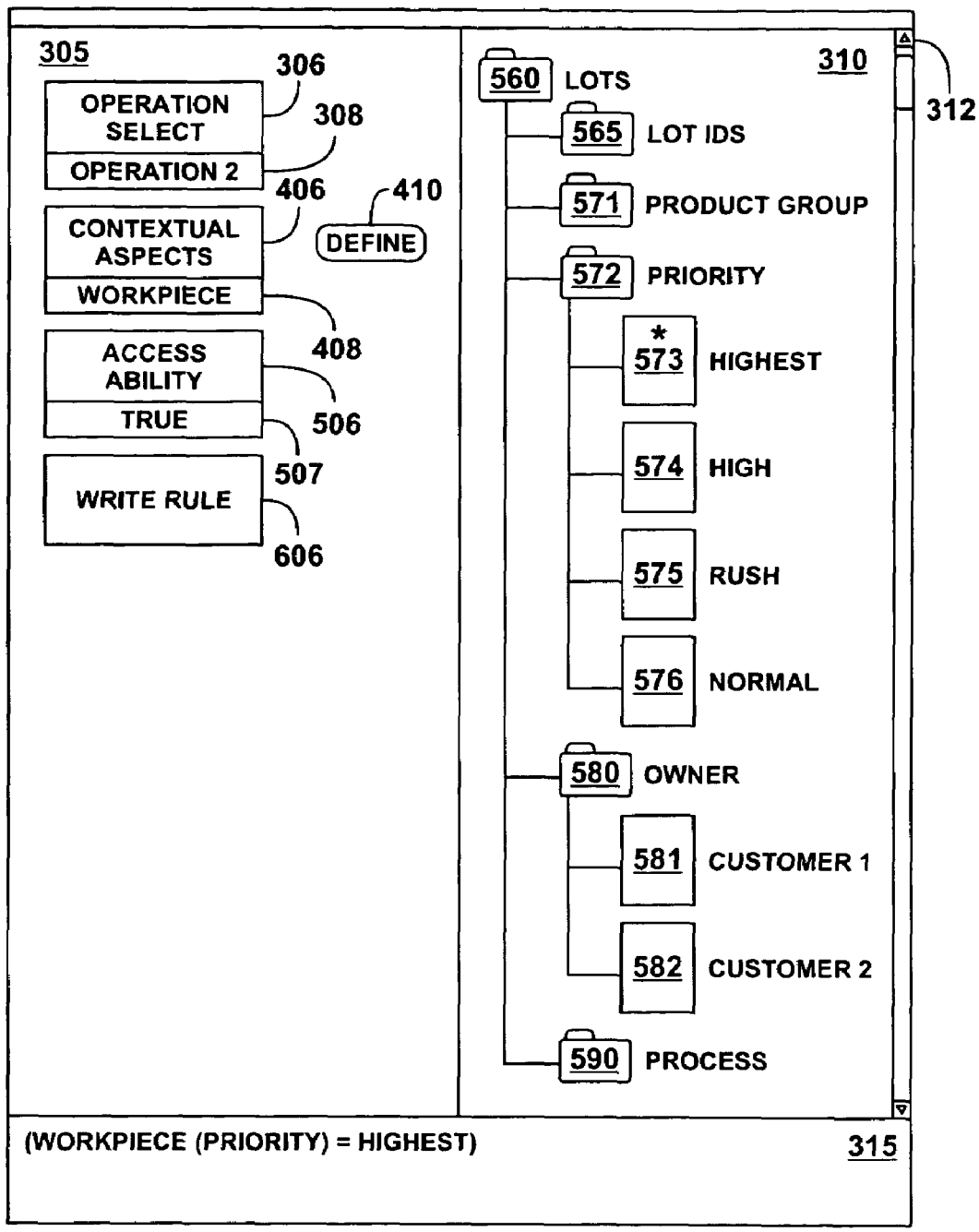

FIG. 12 illustrates another embodiment, whereby the selected aspect, workpiece, relates to a workpiece of the system. The workpiece aspect is used to identify workpiece contexts that will limit access to the aspect(s) selected at step 211.

Returning to our previous example, the rule being defined applies to node 331, which was selected at FIG. 6. Node 331 is associated with a particular manufacturing tool that performs a manufacturing step one or more a workpieces at a time. However, a particular manufacturing tool does not typically have visibility to specific workpiece information, if any. For example, a particular tool may not have any knowledge of a workpiece that it is currently processing. Instead, workpiece information, including its present location, is typically stored in a separate data model that is used to control the flow of workpieces throughout the Enterprise System. However, selection of WORKPIECE as a specific aspect results in the Graphical Security Policy Developer 40 providing a GUI that allows selection of specific workpiece contexts to the rule being defined.

In FIG. 12, branch 560, labeled "Lots" indicates that the workpiece being modified is part of a lot, such as a lot associated with a semiconductor manufacturing facility. A branch 565, labeled "Lot ID" can be browsed to identify a specific lot identifier as a context of a security regulation for the rule being defined. Also, by browsing the branch labeled "Lot ID", individual members (wafers) of the lot can be contextually identified. Therefore, nodes within branch 565 would list individual lot and wafer names or identifiers as specific contexts. Branch 571, labeled "Product Group" can be browsed to select a specific product or product group as a specific workpiece context of a security regulation. Branch 572, labeled "Priority" can be browsed to select a specific priority level as a specific workpiece context of a security regulation. Nodes 573-576 of the branch labeled PRIORITY indicate possible contextual values of HIGHEST, HIGH, RUSH, and NORMAL. As illustrated, the node 573 has been selected, resulting in a textual representation of a security regulation indicated below:

(WORKPIECE(PRIORITY)=HIGHEST)

The syntax "WORKPIECE(PRIORITY)" indicates the priority context of a workpiece associated with an aspect selected at step 211, i.e. the NODE 321. Note that the syntax has been chosen for clarity of discussion, and that many other syntax can be used to indicate a workpiece priority context is to be checked.

Branch 580, labeled "Owner" can be browsed to select a specific owner identifier as may be associated with a specific workpiece as a context of a security regulation. Branch 590, labeled "PROCESS" can be browsed to select a process flow or specific process parameters associated with a specific workpiece context.

Figure 13:
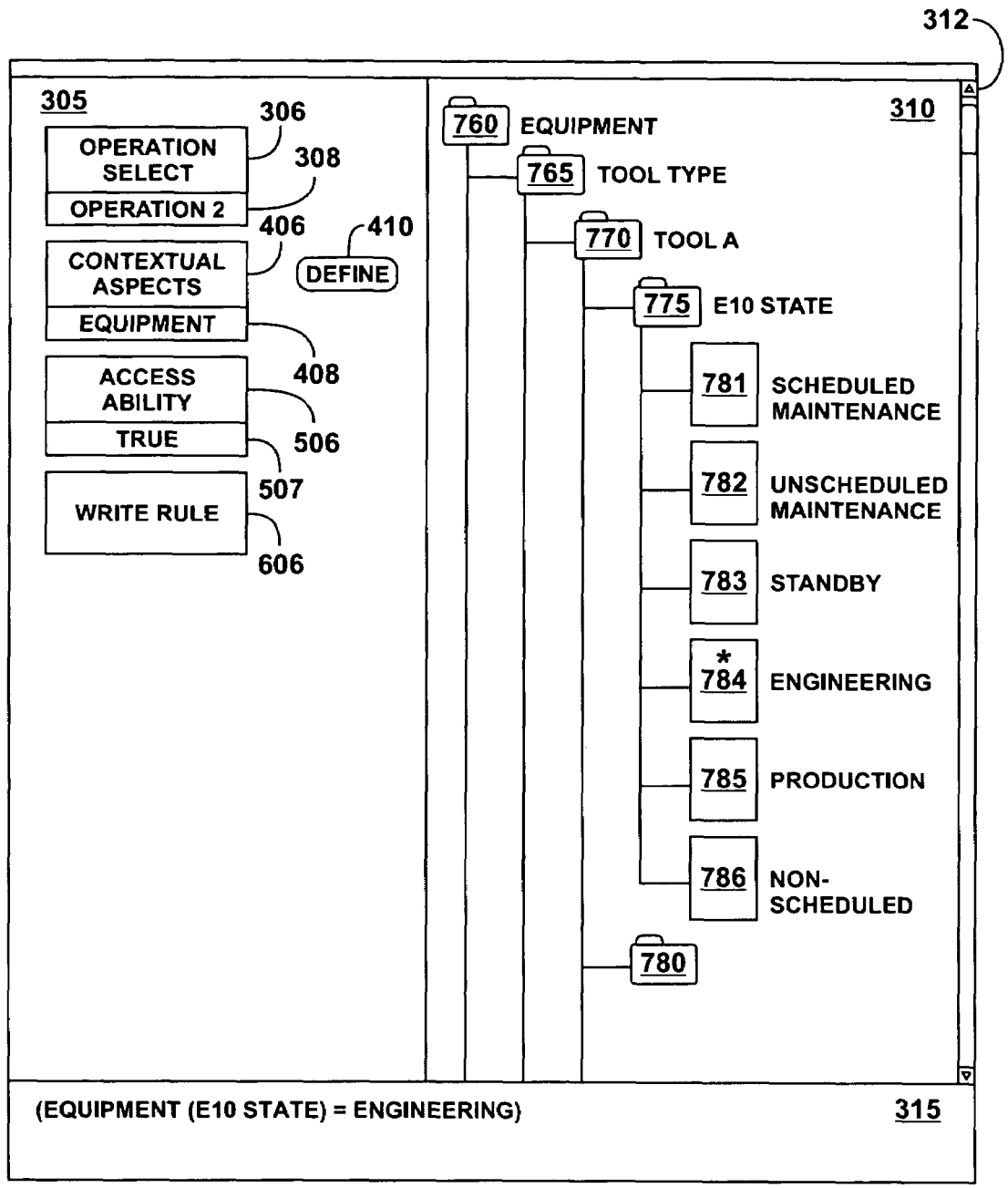

FIG. 13 illustrates another example where CONTEXTUAL ASPECTS 406 has been selected to identify EQUIPMENT. Viewable portion 310 illustrates a tree-type structure for equipment that includes E10 states, as known in the semiconductor industry, 781-786 as leaves of a branch 775, which is a member of the branch 770 TOOL A, which is a member of the branch 765, TOOL TYPE, which is a member of the branch 760, EQUIPMENT. The leaf 784, corresponding to the E10 state Engineering is currently selected and a clause corresponding to the selection is illustrated in area 315.

Figure 14:
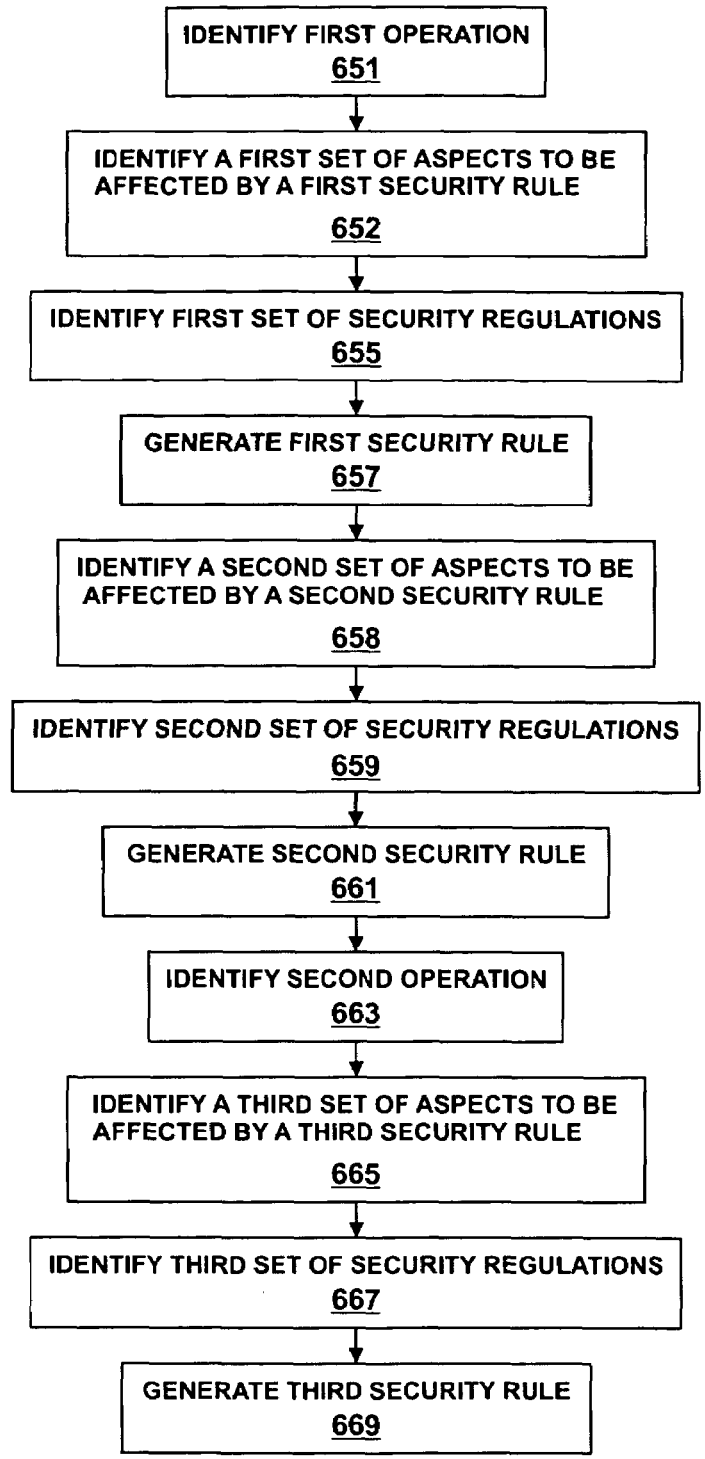
FIGS. 14, 15, and 18 illustrate in flow diagram form a method in accordance with a specific embodiment of the present disclosure.

FIG. 14 illustrates in flow diagram form, a method in accordance with the present disclosure. More particularly, the method of FIG. 13 indicates how multiple rules based on same or differing aspects can be generated for a specific security policy.

At step 651, a first operation is identified in a manner similar to that described with step 210 previously. At step 652, a first set of aspects, to be affected by the security rule, are identified in a manner similar to that described at step 211 previously. At step 655, a first set of security regulations are identified. For example, the first set of security regulations can be identified using the CONTEXTUAL ASPECTS button 406 described previously. At step 657, a first security rule is generated based upon the selections made at steps 651, 653, and 655.

At step 658, without identifying a different operation, a second set of aspects to be affected by the security rule, are identified. Since the current rule being generated is based upon the operation selected at 651, the second set of aspects can be selected to be the same or different from the first set of aspects. At step 659, a second set of security regulations, which may be the same or different from the first set of security regulations, are identified. At step 661, a second security rule is generated based upon the selections made at steps 651, 658, and 659.

At step 663, a second operation, different from the first operation, is identified in a manner similar to that described at step 210 previously. At step 665, a third set of aspects to be affected by the security rule being defined is identified in a manner described previously. Depending upon the specific operations, it may or may not be possible for an overlap between the third set of aspects and either the first or second set of aspects. At step 667, a third set of security regulations are identified. As before, the third set of security regulations can be identified using the CONTEXTUAL ASPECTS button 406 described previously. At step 669, a third security rule is generated based upon the selections made at steps 663, 665, and 667.

Though the present disclosure has been discussed primarily with respect to a semiconductor fabrication facility, it will be appreciated the rule generation system and method described can apply to a wide variety of enterprises. For example, an Enterprise System can be any tangible system involved in the manufacture, process, or sale of goods or services. An Enterprise System may itself be part of a larger Enterprise System, as well as comprise multiple Enterprise Systems of its own. For example, a large Enterprise System may have multiple manufacturing and assembly facilities. In turn, each of these facilities may be considered Enterprise Systems. A tangible system is a physical system as opposed to purely a simulated or modeled system. Table 2 illustrates specific examples of high-level tangible Enterprise Systems

TABLE 2

| ENTERPRISES |
| --- |
| FACTORY -- MANUFACTURING |
| FACTORY -- ASSEMBLY/PACKAGING |
| REFINERY |
| SERVICE ORGANIZATIONS |

An aspect of an Enterprise System is a feature of Enterprise System. A specific aspect of an Enterprise System is typically controllable or observable. For example, a temperature sensor is an example of an aspect of an Enterprise System. Examples of broad system aspects are listed in Table 3 and include specific tools (equipment), users, work pieces, and control states.

TABLE 3

| SYSTEM ASPECTS |
| --- |
| EQUIPMENT |
| USERS |
| HUMAN RESOURCES |
| WORKPIECE/INVENTORY |
| SALES INFORMATION |
| CONTROL |

A first type of aspect listed is equipment. Within a complex Enterprise System, there can be multiple types of equipment, and within each type, multiple equipment pieces of that type.

As discussed previously, specific states of aspects are referred to as contexts. Multiple contexts can be associated with a given aspect of an Enterprise System. For example, a manufacturing facility can have a context that indicates it is a production mode or a maintenance mode, and a context to indicate a current operating capacity. A specific aspect may or may not have visibility to its own contexts. For example, a specific tool (aspect) may have visibility, or knowledge, of the existence (context) of its own sensors, or even visibility to states (context) of each sensor, such as ON or OFF. However, the specific tool may not have visibility through its own data model to its own operational state, which can be a context visible only to a different aspect of the Enterprise System, such as a factory control aspect. For example, a control aspect of the Enterprise System can associate a tool with a specific factory, workpiece, or operational context, such as a maintenance mode or a production mode. Table 4 indicates an example of an aspect pertaining to operational states. An operational state is an aspect that may be associated with a tool or other operation of a factory, without the tool having visibility to the state through its data model. Other aspects that may not be visible to the tools to which they apply include: availability of a tool (up or down); amount of use of a tool (time or runs) since last preventative maintenance; qualification state of a tool, etc.

TABLE 4

OPERATIONAL STATES

PRODUCTION
SCHEDULED MAINTENANCE
UN-SCHEDULED MAINTENANCE
ENGINEERING
STANDBY
NON-SCHEDULED OPERATION

A graphical method of identifying specific contexts of pertinence for a rule being defined was described herein with reference to aspect identification (step 211), requestor identification (step 212), and identification of prioritization of workpieces (FIG. 12).

Various aspects 20 of the Enterprise System 10 of FIG. 1 are illustrated as reference numerals 21, 22, and 23. The data models of these aspects can be stored at the aspects 21-23 themselves, or can be represented in the data portion 30 as corresponding data models, i.e. data models 31, 32, and 33. The actual data and state information for the various aspects 20 of the Enterprise System can be stored at the aspects 21-23, or can be stored as contextual information at the location Enterprise System Contexts 34. For example, for an aspect that is a manufacturing tool with sensors, the sensor data can be accessed at the tool directly, i.e. at Aspect 21. However, other data, such as the tool's E10 state or the priority of a lot at the tool, may not be available at the tool, but instead from the Enterprise System Contexts 34 or directly from a different aspect of the Enterprise System 10. Note, in one embodiment, the security module 50, which contains a rules engine, determines current contexts of the Enterprise System based on data stored in the data portion 30, and not by accessing the aspects of the Enterprise System 20 directly. The specific system aspects of Table 3 can themselves contain additional aspects.

In many industries, such as the semiconductor industry, the data models of tools are readily accessible from the tools through query operations that can be employed by the Graphical Security Policy Developer 40 or other tool, thereby readily facilitating configuration of the data models 31-33, and the Developer 40 in a dynamic manner to identify aspect changes of the Enterprise System 10. In an alternate embodiment, the data models 31-33 and Graphical Security Policy Developer 40 can be pre-configured with information identifying where their data models representing system aspects and their contexts are stored.

Figure 15:
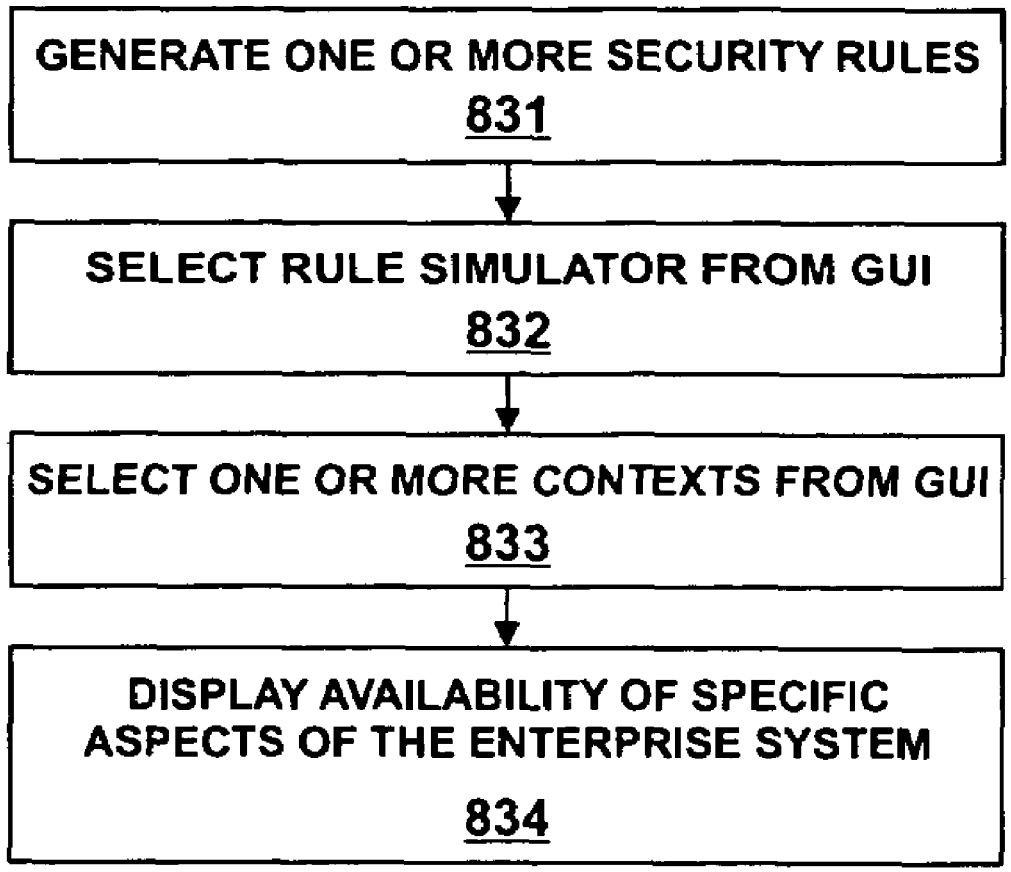

FIG. 15 illustrates a flow diagram in accordance with a specific method of the present disclosure. At step 831, one or more security rules are generated. For example, the methods and systems described in FIGS. 1-14 can be used to generate one or more security rules. In one embodiment, a plurality of security rules is selected to form a security policy.

At step 832, a rule simulator is selected from a graphical user interface for operation. In one embodiment, the rule simulator is selected by a button, drop-down menu, or other means, through one or more of the GUI interfaces illustrated previously herein. In one embodiment, the rule simulator may use a rule interpretation engine of an actual security system to provide simulated results.

Figure 16:
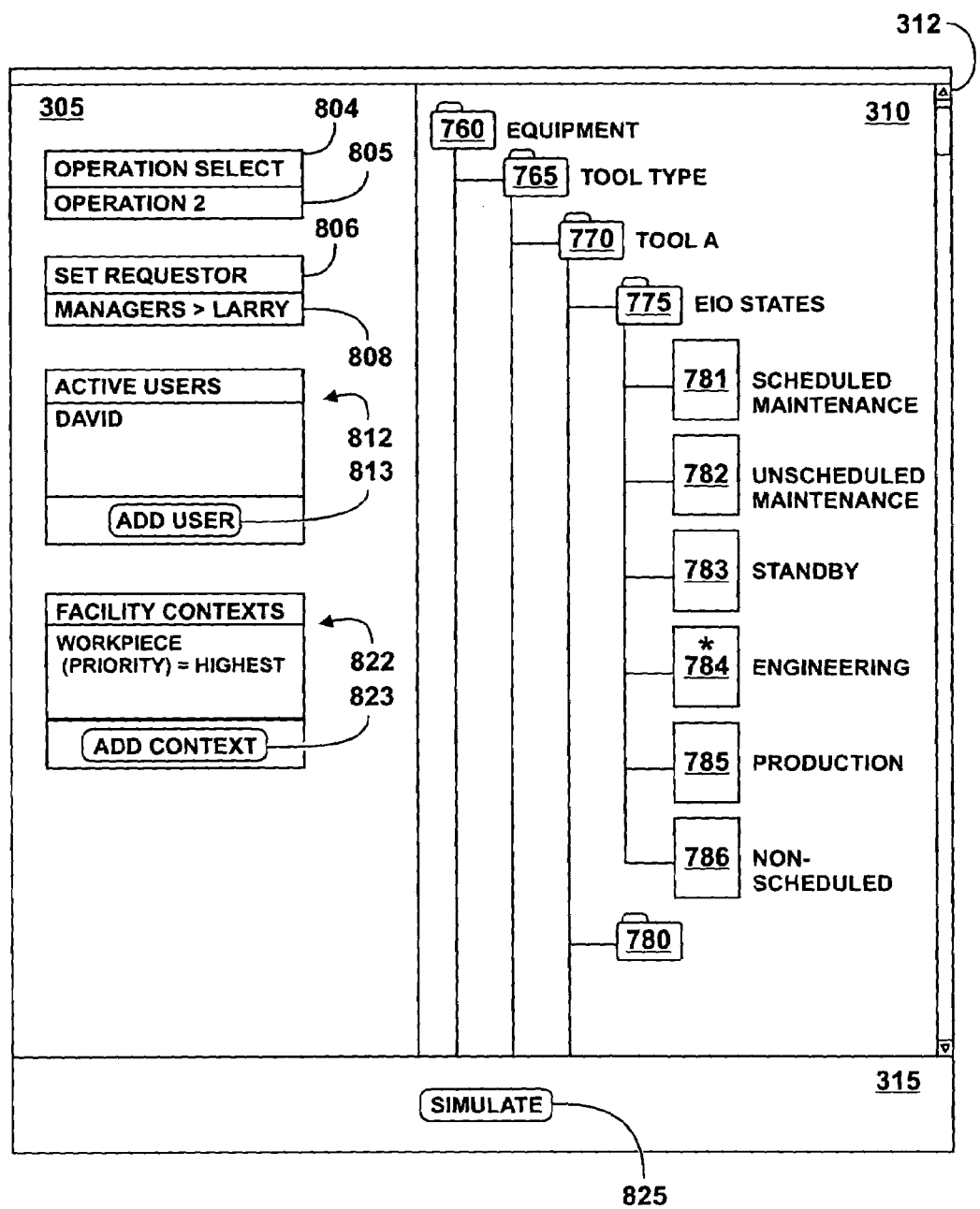

At step 833, one or more contexts of the enterprise system are selected from a GUI of the simulator to indicate a current operating condition or state of the enterprise system. FIG. 16 illustrates a specific example of GUI for a simulator that allows aspects including a requester, operation, active users, and facility contexts, i.e. enterprise contexts, to be selected for simulation.

In the specific example of FIG. 16, the SET REQUESTOR option 806 has been previously selected to identify Larry, who belongs to the group of Managers, as the requester. The ACTIVE USERS window 812 has been previously updated from within the simulator of FIG. 16 to identify David as an active user. An active user can include a user that is currently logged on, or receiving information from the enterprise system. Specific facility contexts are listed in area 822. Presently, a facility context indicating that the equipment is in an E10 state of engineering has been identified, and selection of the button labeled ADD CONTEXT will add the context to further indicate a current E10 state of Engineering to the area 822, see of FIG. 17.

Figure 17:
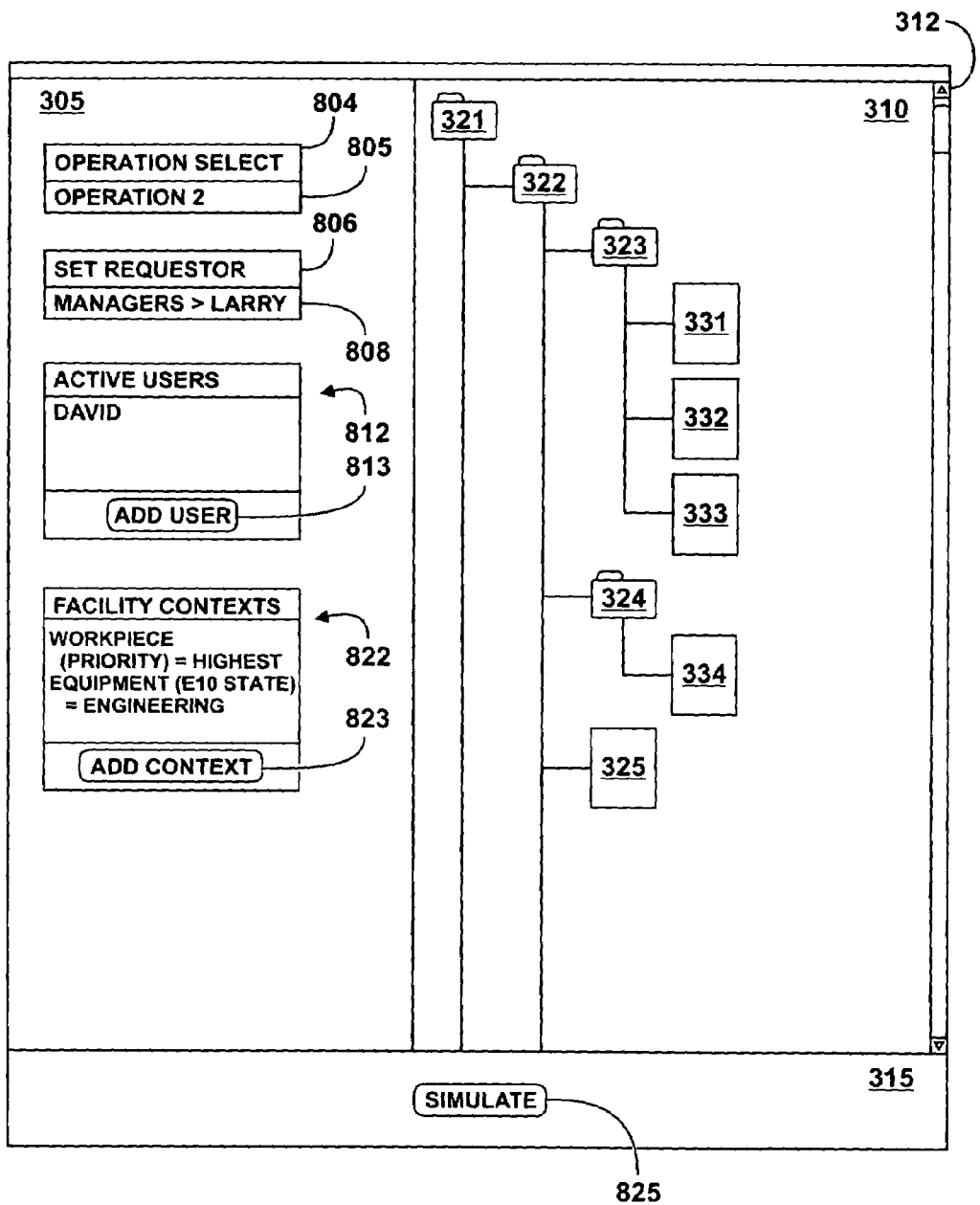

Referring to FIG. 17, which lists a priority context and an equipment E10 state context in area 822, a selection of the SIMULATE button 825 will apply the identified state information to all rules associated with a tree-type hierarchical representation of a data model or a subset of a data model.

Once all of the rules are simulated based upon the current contexts, the results are displayed, see step 834. For example, as illustrated in FIG. 17, the results can be displayed in area 310 to illustrate the accessibility of various aspects of the enterprise system. For example, FIG. 17 illustrates the tool and node aspects illustrated in area 310 of FIG. 5 in a hierarchical manner to allow display of simulation results. In one embodiment, aspects not accessible given the enterprise state being simulating are displayed in red, aspects that are accessible given the enterprise state being simulated are displayed in green, aspects that are conditionally accessible, as previously described, are displayed in yellow. For example, node 331 may be red, node 334 may yellow, and nodes 332 and 325 may be green.

It will be appreciated that other visual indicators besides red, green and yellow can be displayed. It will be appreciated that when multiple rules are being simulated, such as with a specific security policy, that each individual rule may provide different accessibility result for a specific aspect of a system. For example, one rule may allow an aspect of a system to be accessible for a given set of simulation parameters, while another rule would not allow accessibility for the same set of simulation parameter. Typically, the most restrictive access result will be enforced, however, the simulator can be configured, such as through a graphical user interface, to enforce either more or less restrictive access results when differing results are generated for the same aspect by different rules. This allows the simulator to match the operation of the rule interpretation engine.

Because security rules and policies can be very complex, the ability to simulate specific conditions and graphically view results allows for a greater degree of accuracy during the rule generation process. Typically, the simulator will provide the security policy and simulation information to the security module, which includes a rules engine, for analysis, and receive from the security module 50 accessibility information for each node being viewed.

Figure 18:
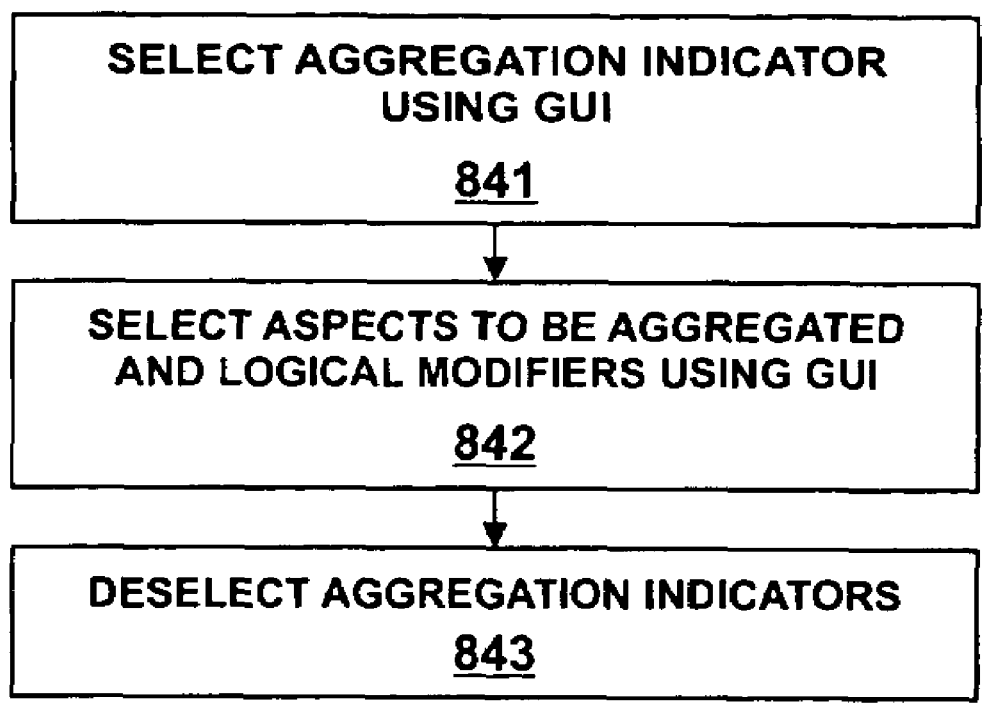

The present disclosure has been described with respect to specific embodiments. It will be appreciated that many variations to the disclosed system and method herein are anticipated. For example, a method of logically aggregating aspects of a request within a rule to determine existence of a condition provides further flexibility. For example, it may be desirable determine if an access request is attempting to obtain a certain combination of information, and if so, to prevent access to some or all of the information. FIG. 18 illustrates a flow diagram to facilitate such aggregation requests using a graphical user interface.

At step 841, a logical aggregation indicator is selected using the GUI to begin the aggregation process. Such an aggregation indicator identifies a clause being defined as an aggregation of contexts to be evaluated based upon an access request, and may be selected using a radio button, menu, list, or other graphical interface. At step 842, aspects to be aggregated, and any corresponding logical modifiers, are selected using a GUI. For example, referring to FIG. 5, nodes 331 and 333 could be selected along with logical modifiers to identify them as nodes to be included in the aggregation clause. Such an aggregation clause can be a logic clause having a syntax of (AGGREGATION ((ASPECT=NODE 331) AND NOT (ASPECT=NODE 333)), where the term AGGREGATION, for the present example, indicates a clause that when evaluated to TRUE by a rules engine will allow access to information associated with NODE 331. Therefore, an aggregation clause can be used to control access to a request for a first data, i.e. node 331 data, based upon whether an access request for a second data, i.e. node 333 data, has also occurred. Note that requests for information are typically submitted as a data collection plan that requests more than one specific piece of information. The use of an aggregation clause can be used to limit a single data collection plan from successfully requesting specific data combinations. For example, a rules engine will not allow NODE 331 to be accessed when the above clause evaluates to true. In an alternate embodiment, a temporal component can be used to prevent access to specific combinations of information within a predetermined time frame. For example, the predetermined time frame can be a fixed amount of time, such as one minute, that is implicit, as part of the aggregation clause itself, or explicitly specified as part of the aggregation clause. Alternatively, the predetermined time frame can be considered to be the amount of time needed to execute a data collection plan, thereby allowing generation of rules that prevent a common data collection plan from accessing specific combinations of information.

Realizations in accordance with the present disclosure have been described in the context of particular embodiments. These embodiments are meant to be illustrative and not limiting. Many variations, modifications, additions, and improvements are possible. Accordingly plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

What is claimed is:

1. A method of generating security rules for an enterprise system associated with a semiconductor fabrication facility comprising:
   receiving a security policy from a security officer;
   indicating a first operation through a graphical user interface, the first operation associated with a first set of equipment of the enterprise system, wherein the enterprise system comprises a plurality of tangible equipment associated with the fabrication of semiconductor devices that includes the first set of equipment, wherein the first operation is included in a table of operations, the first operation selected from the group consisting of at least one of: a sensor read, FTP access, equipment register access, routine definition, routine deletion, routine activation, routine deactivate, remote operation, data collection plan, work pieces, data models, and equipment logon, and wherein the graphical user interface is configured to represent the plurality of tangible equipment, the first operation, the security policy, and users of the semiconductor fabrication facility;
   indicating through the graphical user interface a second set of equipment from a graphical representation of the first set of equipment, the second set of equipment being a subset of the first set of equipment; and
   generating a security policy rule indicating accessibility to information at each equipment of the second set of equipment, the security policy rule constructed from information associated with the first set of equipment, the second set of equipment, and the first operation.

2. The method of claim 1, wherein the security policy rule indicating accessibility authorizes access to the first operation at the second set of equipment.

3. The method of claim 1, wherein the security policy rule indicating accessibility denies access to the first operation at the second set of equipment.

4. The method of claim 1, wherein the security policy rule indicating accessibility authorizes access to a modified first operation at the second set of equipment, the modified first operation being different than the first operation.

5. The method of claim 4, wherein when the first operation is a data access operation allowing access to a first data, the modified first operation is a data access operation allowing access to a transformed first data.

6. The method of claim 5, wherein the modified first data is a transformed representation of the first data.

7. The method of claim 1, further comprising:
   indicating through the graphical user interface at least one security regulation based upon a first context of the enterprise system.

8. The method of claim 7, wherein with respect to a specific equipment the second set of equipment, the first context is an enterprise context, wherein the enterprise context identifies an operational state of the enterprise system.

9. The method of claim 8 wherein the operational state of the enterprise system indicates an operational mode of a specific equipment of the second set of equipment.

10. The method of claim 9, wherein the operational state of the specific equipment is one of a maintenance state and a production state.

11. The method of claim 10, wherein the maintenance state of the specific equipment is one of scheduled maintenance and unscheduled maintenance.

12. The method of claim 9, wherein the operational state of the specific equipment is one of a maintenance state, a production state, an engineering state, a non-scheduled state, and a standby state.

13. The method of claim 7, wherein, with respect to a specific equipment of the second set of equipment, the first context is associated with a workpiece associated with the enterprise system.

14. The method of claim 13, wherein the first context indicates a priority of the workpiece.

15. The method of claim 13, wherein the first context indicates a process associated with the workpiece.

16. The method of claim 13, wherein the first context indicates a product associated with the workpiece.

17. The method of claim 13, wherein the workpiece is associated with the specific tool.

18. The method of claim 17, wherein the workpiece is at the specific tool.

19. The method of claim 1 further comprising:
    selecting a simulation mode through the graphical user interface;
    selecting one or more simulation contexts of the enterprise system;
    applying the one or more simulation contexts to the first rule to simulate an accessibility of one or more aspects of the enterprise system; and
    graphically displaying the availability of the one or more aspects of the enterprise system.

20. The method of claim 19, wherein aspects that are accessible comprise a first graphical indicator, aspects that are not accessible comprise a second graphical indicator, and aspects that are conditionally accessible comprise a third graphical indicator.

21. The method of claim 1, wherein the second set of equipment includes indicating through the graphical user interface a security regulation based upon a relationship of a first context and second context of an access request.

22. The method of claim 1, wherein indicating through the graphical user interface the second set includes indicating a third set of equipment from the graphical representation of the first set of equipment by indicating a group indicator, wherein each member associated with the group indicator is a member of the third set, and further indicating the second group through the graphical user interface by indicating at least one member of the third set for exclusion from the second set.

23. The method of claim 1, wherein the first operation is a sensor read.

24. The method of claim 1, wherein the first operation is FTP access.

25. The method of claim 1, wherein the first operation is equipment register access.

26. The method of claim 1, wherein the first operation is routine definition.

27. The method of claim 1, wherein the first operation is routine deletion.

28. The method of claim 1, wherein the first operation is routine activation.

29. The method of claim 1, wherein the first operation is routine deactivate.

30. The method of claim 1, wherein the first operation is remote operation.

31. The method of claim 1, wherein the first operation is data collection plan.

32. The method of claim 1, wherein the first operation is work pieces.

33. The method of claim 1, wherein the first operation is data models.

34. The method of claim 1, wherein the first operation is equipment logon.

35. A system for generating security rules for an enterprise system associated with a semiconductor fabrication facility comprising:
    a graphical user interface capable of representing the plurality of equipment, operations, security policies entered by a security officer, and users that utilize the semiconductor fabrication facility;
    a memory to store a table of operations that are utilized in semiconductor facility wherein the operations stored in the table of operations can be selected from a group consisting of at least one of: a sensor read, FTP access, equipment register access, routine definition, routine deletion, routine activation, routine deactivate, remote operation, data collection plan, work pieces, data models, and equipment logon;
    the memory to store an equipment list of tools and sensors utilized in the semiconductor fabrication facility, wherein equipment can be associated with a first operation through the graphical user interface, the first operation associated with a first set of equipment of the enterprise system, wherein the enterprise system comprises a plurality of tangible semiconductor fabrication equipment that includes the first set of equipment; and
    a rule generation module to generate a security policy rule indicating accessibility to a selected operation of the plurality of operations at the second set of equipment, the security policy rule to be constructed from information associated with the first set of equipment, a second set of equipment, and the first operation wherein the second set of equipment is a subset of the first set of equipment.

36. The system of claim 35, wherein the first operation is a sensor read.

37. The system of claim 35, wherein the first operation is FTP access.

38. The system of claim 35, wherein the first operation is equipment register access.

39. The system of claim 35, wherein the first operation is routine definition.

40. The system of claim 35, wherein the first operation is routine deletion.

41. The system of claim 35, wherein the first operation is routine activation.

42. The system of claim 35, wherein the first operation is routine deactivate.

43. The system of claim 35, wherein the first operation is remote operation.

44. The system of claim 35, wherein the first operation is data collection plan.

45. The system of claim 35, wherein the first operation is work pieces.

46. The system of claim 35, wherein the first operation is data models.

47. The system of claim 35, wherein the first operation is equipment logon.

* * * * *